Nov. 20, 1928.

S. G. HARWOOD ET AL 1,692,776

VALVE OPERATING MECHANISM

Original Filed March 21, 1925      7 Sheets-Sheet 1

Fig-1

Inventors.
S. G. Harwood.
D. Griswold.
By Whiteley and Ruckman
Attorneys.

Nov. 20, 1928. 1,692,776
S. G. HARWOOD ET AL
VALVE OPERATING MECHANISM
Original Filed March 21, 1925 7 Sheets-Sheet 3

Fig.-3.

Inventors:
S. G. Harwood.
D. Griswold.
By Whiteley and Ruckman Attorneys.

Nov. 20, 1928.

S. G. HARWOOD ET AL 1,692,776

VALVE OPERATING MECHANISM

Original Filed March 21, 1925   7 Sheets-Sheet 4

Inventors
S. G. Harwood.
D. Griswold.
By Whiteley and Ruckman
Attorneys.

Patented Nov. 20, 1928.

1,692,776

UNITED STATES PATENT OFFICE.

STANLEY G. HARWOOD AND DONALD GRISWOLD, OF MINNEAPOLIS, MINNESOTA, ASSIGNORS TO WARD-LOVE PUMP CORPORATION, OF ROCKFORD, ILLINOIS, A CORPORATION OF ILLINOIS.

VALVE-OPERATING MECHANISM.

Application filed March 21, 1925, Serial No. 17,446. Renewed July 6, 1926.

This invention relates to valve operating mechanisms capable of general application but more particularly designed and intended for use with water softeners operating on the base-exchange principle, and is especially concerned with such a mechanism for rendering the operation of the softener fully automatic or semi-automatic.

The principal object of the invention is to provide a novel mechanism under the control of a meter measuring the flow of water through the softener for operating a valve controlling the connections between a water softener tank and the water supply and service systems therefor, and between the softener tank and a regenerating brine tank.

Further objects of the invention are:

First, to provide in a water softener installation comprising a softener tank and brine tank, a single control valve and a valve operating mechanism therefor controlled by a meter inserted in the water supply line, the valve serving to control the communication between the softener tank and the water supply and service systems for softening and between the softener tank and the brine tank for the regenerating operations.

Second, to provide in a water softener installation a meter-controlled valve operating mechanism for delivering water from a single source of water supply, in predetermined quantities and in predetermined sequence, first to the water softener for the softening operation, thereafter from the same source to a regenerating brine tank to cause the passage of a like volume of brine from the brine tank through the softener, thereafter to pass a predetermined volume of water from the same source through the softener to a waste outlet for rinsing or flushing, and thereafter repeat the operations in the same order.

Third, to provide a mechanism of the kind referred to wherein the time of regeneration may be postponed on occasion to suit the convenience of the user so that the regeneration may not occur at an inopportune time.

Fourth, to provide in connection with the time control of regeneration, a suitable signal or alarm operated before regeneration occurs evidencing the fact when the softener has completed its capacity run so that the user is aware that the softener requires regeneration and may or may not delay the regeneration as desired.

Fifth, to provide in a mechanism of the present character, controlling elements in the connection between the meter and the valve whereby the capacity run of the softener is adjusted for different hardnesses of water.

Sixth, to provide in a mechanism of the present character, a means for operating the valve which is merely under the control of the meter as distinguished from a direct operating connection between the valve and the meter. In the present case a spring motor is employed wound up through reduction gearing by the meter so that a very slight and constant effort on the part of the meter mechanism is sufficient to store up sufficient energy to accomplish the shifting of the valve and no real burden is placed on the meter which might prevent the operation of the valve being completed or would, at least, place a strain on the meter.

Seventh, to provide in a mechanism of the present character, gear trains of a high and low ratio in the connections between the meter and the valve to handle the regeneration and rinse operations on the one hand and the capacity run on the other hand.

A still further object is to provide a mechanism of this kind requiring no attention on the part of the user when once installed, the user being permitted only to determine the time of regeneration, as pointed out above, in the case of semi-automatic operation. Aside from this the only concern of the operator shall be that of maintaining the supply of salt in the regenerating brine tank.

In the accompanying drawings which illustrate one form in which our invention may be embodied, Fig. 3ª is a view of a complete installation consisting of a softener tank, regenerating brine tank, control valve, and valve operating mechanism. Figs. 3ᵇ and 3ᶜ are horizontal and vertical sections through the control valve.

Figure 3:
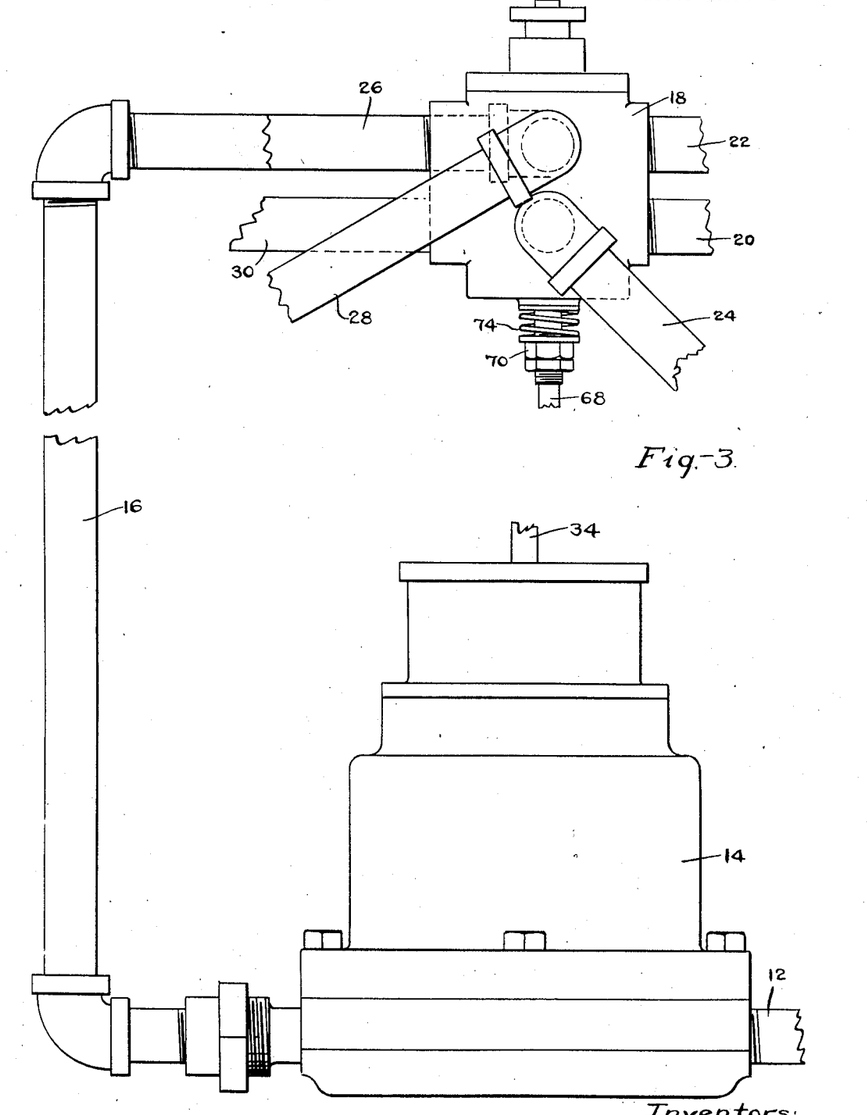
Fig. 3 is an elevational view of the meter and valve casing and certain pipe connections.
Figure 3A:
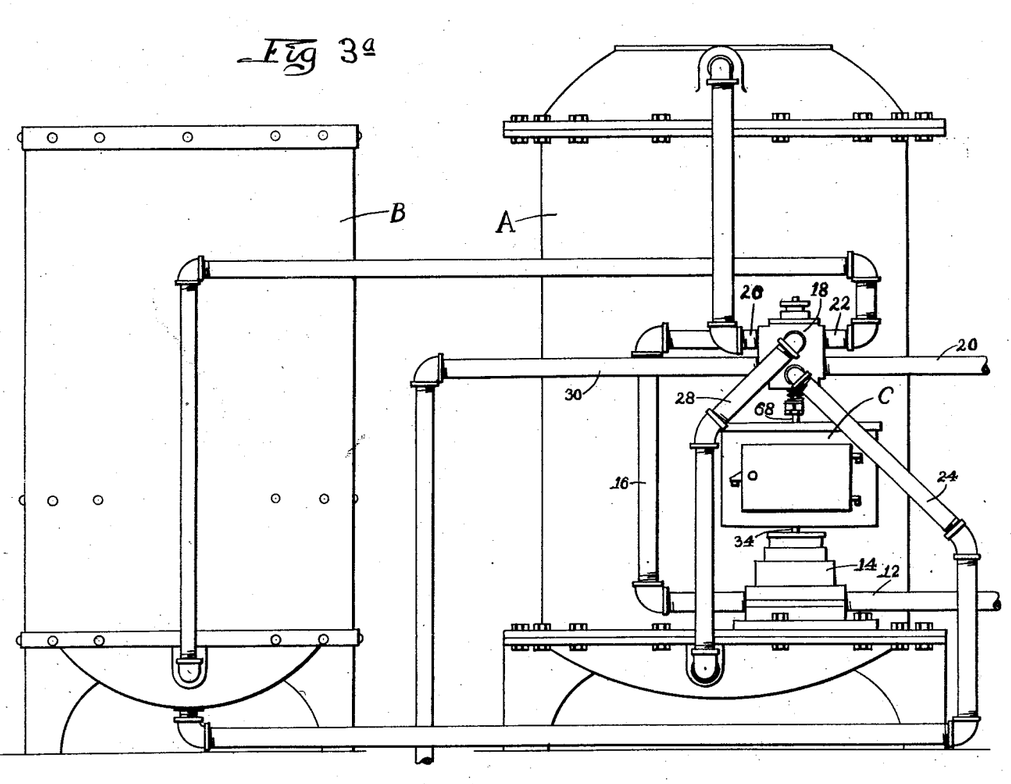
Figure 3B:
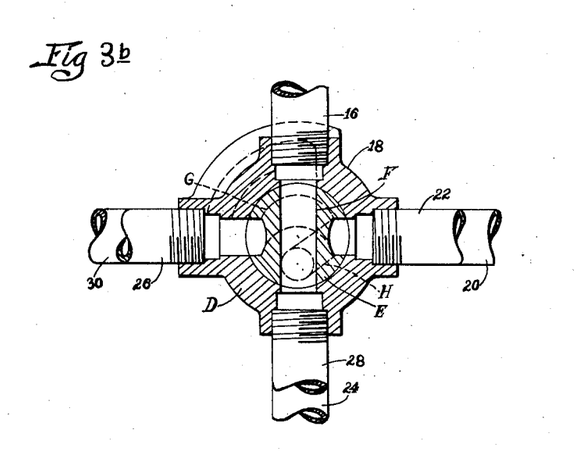
Figure 3C:
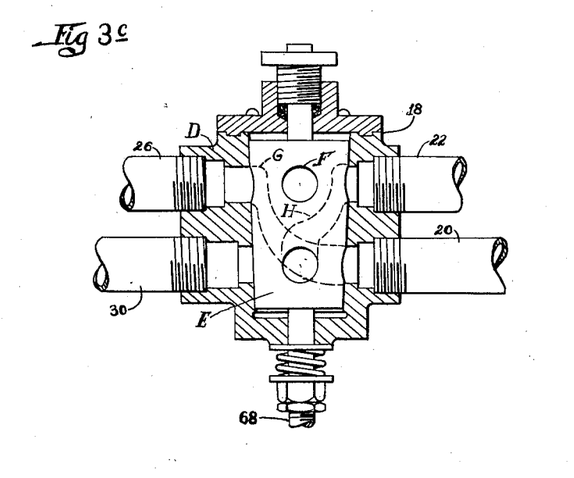

Before proceeding with a detailed description of the valve operating mechanism with which the present invention is more particularly concerned, reference may be had to Figs. 3 to 3ᵉ for a general understanding of the water softening installation and the valve therefor, in connection with which the mechanism of the present invention is arranged to be used. The valve 18 controls the connections between the softener tank A and the water supply and service systems communicating with the pipes 12 and 20, respectively, and also the communication between the softener tank A and a regenerating brine tank B. The valve is arranged to be shifted to different successive positions by an operating mechanism at C under the control of a meter 14. The valve 18 forms the subject matter of our Patent 1,593,300, issued July 20, 1926, and, briefly stated, comprises a casing D and a rotatable plug or core E having a stem 68 rigid therewith and extending from the casing for operation by the mechanism at C. The plug E has three ports therein, F, G, and H arranged to register with ports in the casing D when the plug is shifted to different positions successively for the softening operation, regenerating operation, and the rinse. The registration of the ports in the plug with the ports in the casing determine the communication between the tank A and the supply and service systems communicating with the pipes 12 and 20, respectively, for the normal softening operation, between the tanks A and B and a waste outlet 30 for the regenerating operation, and between the supply pipe 12, tank A and waste pipe 30 for the rinse operation in a manner fully set forth in the co-pending application above referred to. In the softening operation, the water flows from pipe 12 through the meter 14 and pipe 16 into the valve 18 and through registering ports therein into the pipe 28 leading to the bottom of the softener tank A. Passing upwardly through the mineral in the tank A the water is softened in a manner well known in this art and passes out through pipe 26 into the valve 18, thence, through registering ports in the valve, out through the service pipe 20. In the case of the regenerating operation, when the valve 18 has been shifted, the flow of water is as follows:— From the pipe 12 through meter 14 and pipe 16 into and through the valve 18, and through pipe 24 to the inlet of the brine tank B. This hard fresh water entering the inlet of the brine tank displaces a like volume of brine therefrom which passes out through pipe 22 into and through the valve 18, out through pipe 26 into the top of the softener tank A. Passing downwardly through the mineral in the tank A the brine exchanges its sodium for the calcium and magnesium hardness assimilated by the mineral in a manner well known to the art. The brine leaves the tank through pipe 28 and passes into and through the valve 18 out through the waste pipe 30 to the sewer. Upon the completion of the regeneration the circuit of the water is as follows for the rinse operation:—From the pipe 12 through meter 14 and pipe 16 into valve 18, thence through pipe 28 upwardly through tank A out through pipe 26, valve 18, and out through the waste pipe 30 to the sewer. In passing upwardly through the tank A the hard fresh water is softened by the mineral and displaces whatever quantity of hard water may remain in the tank A in the head space over the mineral as the result of the regeneration operation, or any brine which may be in this space. The system is thus free from hard water or any brine or contaminated water. Subsequent to the rinse operation the valve 18 is again shifted to a position corresponding to the normal softening operation of the apparatus. The foregoing will suffice for a general description of the apparatus and will contribute toward a better understanding of the valve operating mechanism now to be described.

Figure 1:
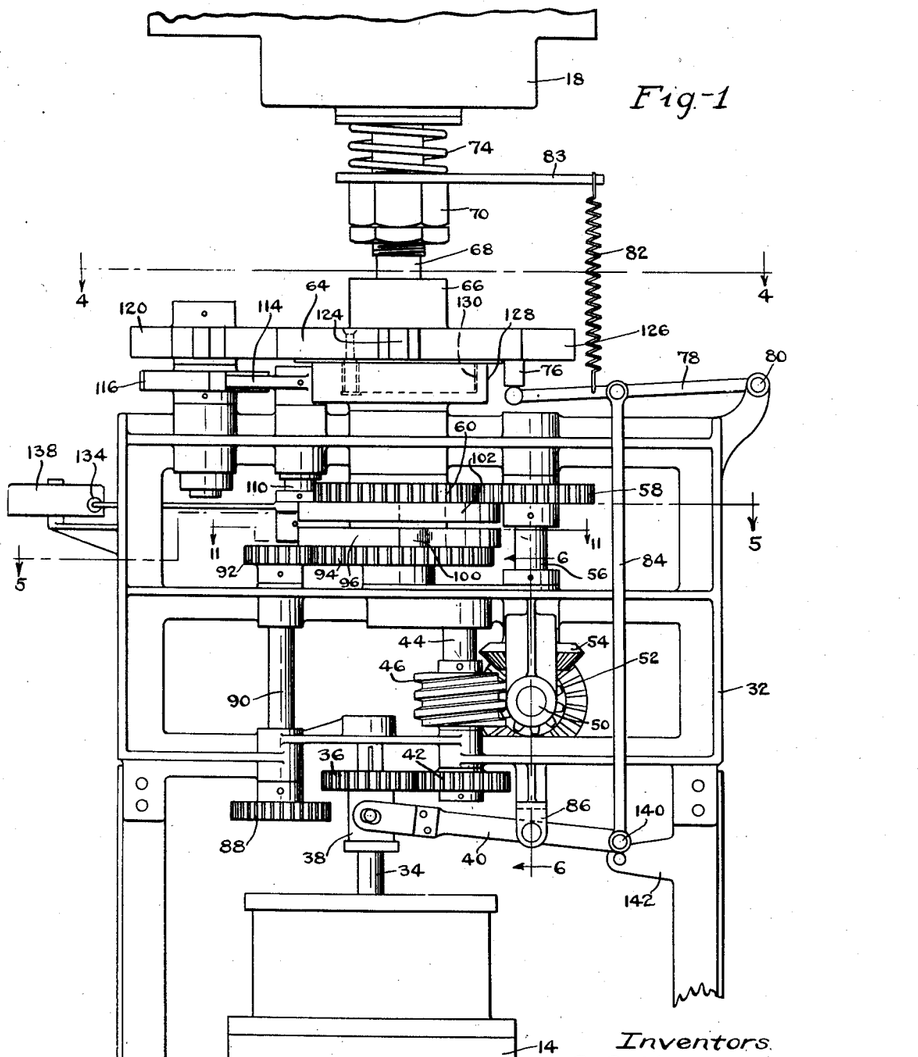
Fig. 1 is an elevational view of the mechanism.
Figure 2:
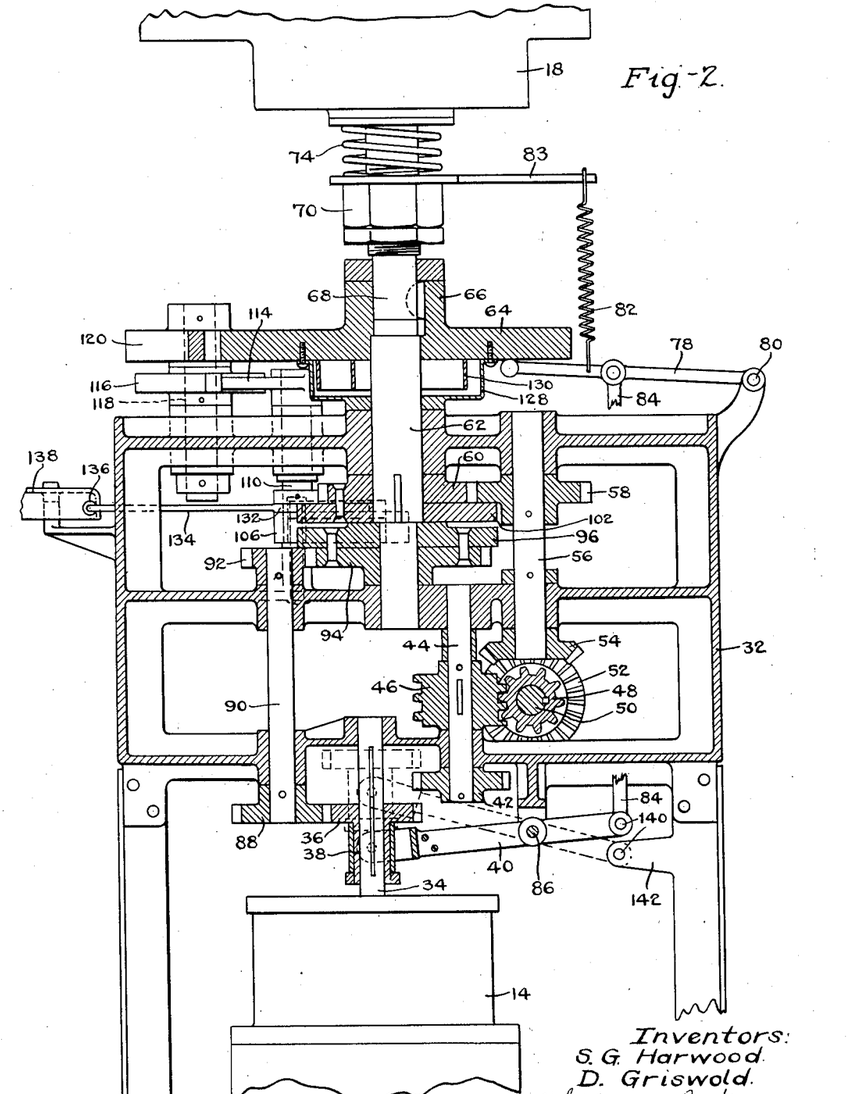
Fig. 2 is a view substantially in vertical section and showing some of the parts shifted into different position from that of Fig. 1.
Figures 5, 6, 7:
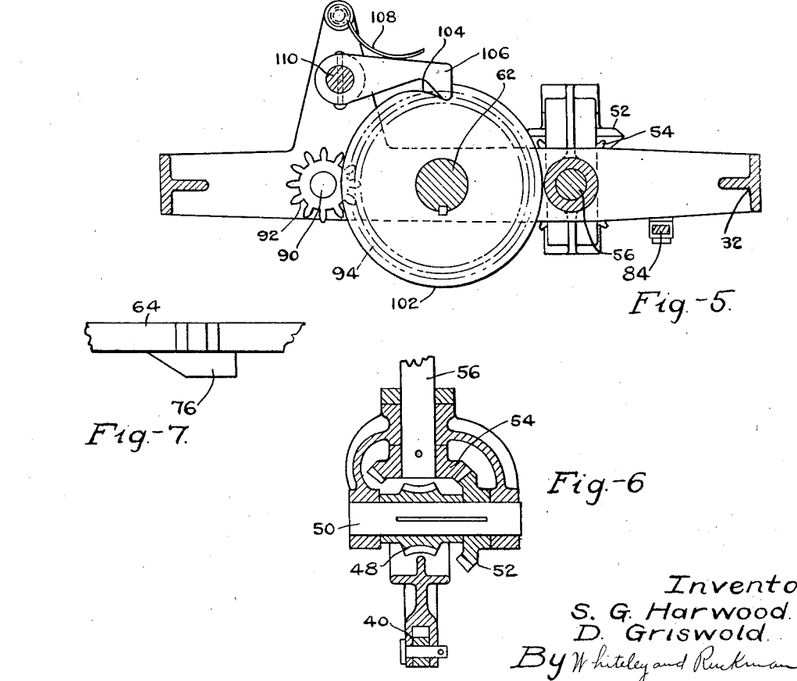
Fig. 5 is a view in horizontal section on the line 5—5 of Fig. 1.
Fig. 6 is a view in vertical section on the line 6—6 of Fig. 1.
Fig. 7 is a detailed view of a cam.

As shown in Figs. 1 and 2, the valve operating mechanism is supported by a suitable frame 32 which carries bearings for various shafts which will be referred to later. The shaft 34 of the meter projects from the top of the casing 14 and a gear 36 having a hub 38 is splined on this shaft, the gear being adapted to be shifted by a lever 40 which will be referred to later. The gear 36 in its position shown in Fig. 1, meshes with a gear 42 secured to the lower end of a vertical shaft 44 to which is secured a worm 46 meshing with a worm gear 48 to provide a reduction gearing. As best shown in Fig. 6, the worm gear 48 is secured to a horizontal shaft 50 to one end of which is secured a bevel gear 52 meshing with a bevel gear 54 secured to the lower end of a vertical shaft 56. To the upper portion of the shaft 56 is secured a gear 58 which meshes with a gear 60 secured to an intermediate portion of a shaft 62 on the upper end of which is loosely mounted a toothed wheel 64 having a hub 66 extending upwardly beyond the end of this shaft. The valve in the casing 18, as stated above has a downwardly extending stem 68 which is splined in the hub 66 as best shown in Fig. 2. The stem 68 is provided with lock nuts 70 and a coiled spring 74 surrounds the stem 68 between the lock nuts and the bottom of the valve casing 18 so that the valve is urged resiliently downwardly in the casing. If the valve wears, the lock nuts may be turned upwardly so that the valve will be held firmly to its seat, the splined connection of the stem 68 with the hub 66 permitting the valve to contact with its seat regardless of wear. The under surface of the wheel 64 carries a cam 76 having a considerable dwell as shown in side elevation in Fig. 7. In the position of the wheel 64, shown in Fig. 1, the cam 76 engages and depresses the free end of a lever 78 which is pivoted to the frame at 80. A spring 82 attached to this lever and to a bar 83 which may be supported in any suitable manner serves to hold the free end of the lever upwardly when not engaged by the cam as will be apparent from Fig. 2. A link 84 connects the lever 78 with the outer end of the lever 40 previously referred to, the lever 40 being intermediately pivoted at 86 to a projection carried by the frame.

Figures 8, 9, 11:
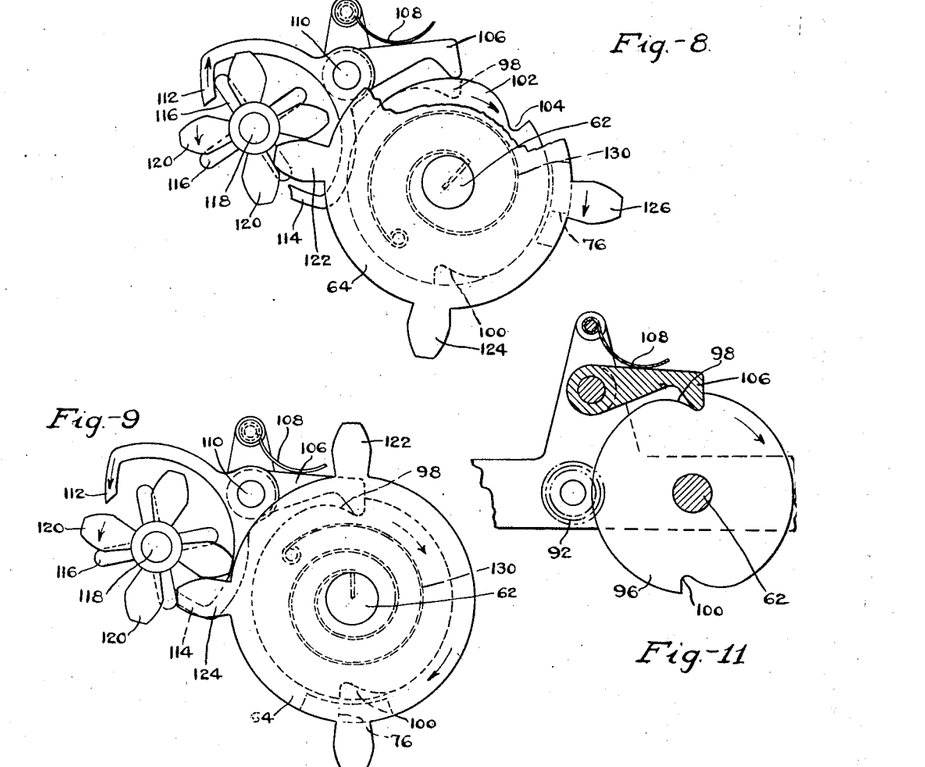
Figs. 8, 9 and 10 are views corresponding generally to Fig. 4 but showing some of the parts moved into different positions.
Fig. 11 is a view in horizontal section on the line 11—11 of Fig. 1.

When the inner end of the lever 78 is permitted to move upwardly, the gear 36 is slid downwardly into the position shown in Fig. 2, being thereby disengaged from the gear 42 and brought into mesh with a gear 88 secured to the lower end of a vertical shaft 90 to the upper end of which is secured a gear 92 which meshes with a gear 94 mounted freely on the lower end of the shaft 62. Secured to the upper surface of the gear 94 is a disk 96 having two inclined notches 98 and 100 formed at diametrically opposite places on its periphery as shown in Fig. 11, the inclination of the notches being rearwardly directed. Above the disk 96 is a disk 102 secured to the lower surface of the gear 60 so as to rotate therewith. The disk 102 is provided with a single inclined notch 104 formed in its periphery as shown in Fig. 5 with the inclination rearwardly directed. A pawl 106 pressed by a spring 108 engages the peripheries of both of the disks 96 and 102 although preferably only the lower portion of the periphery of the disk 102 is thus engaged. This pawl is secured to the lower end of a vertical rod 110 to the upper end of which is secured an escapement arm having pallets 112 and 114 on its respective ends adapted to engage in succession with four arms 116 arranged 90 degrees from each other around a vertical rod 118. Above the arms 116, a star wheel is secured to the rod 118, this star wheel having four points or teeth 120 which during the operation of the escapement are successively engaged by three teeth 122, 124 and 126 carried on the periphery of the toothed wheel 64 previously referred to. The teeth 122 and 124 and also the teeth 124 and 126 are spaced 90 degrees from each other while the teeth 122 and 126 are 180 degrees from each other with no intervening tooth on one side of the wheel. By referring to Fig. 2, it will be observed that a spring motor casing 128 is secured to the under surface of the toothed wheel 64. This casing contains a spiral spring 130 whose inner end is secured to the shaft 62 and whose outer end is secured to the motor casing. This spring will therefore be wound when the gear 36 is in mesh with the gear 42 and the meter is running.

We preferably provide a signal to announce the fact that the regenerating operation is shortly to commence; during which period it will be understood that water is cut off from the service pipe. One form in which the signal may be embodied will be understood from Figs. 2 and 4. A spring pressed pawl 132 is loosely mounted on the rod 110 just above the attached pawl 106. The pawl 132 is shorter than the pawl 106 and its point rides in contact with the upper portion of the periphery of the disk 102 while the pawl 106 rides in contact with the periphery of the lower disk 96 and the lower portion only of the periphery of the upper disk 102. Extending out from the pawl 132 is an arm, 134 carrying a hammer 136 adapted to strike a bell 138 when the pawl 132 drops quickly into the notch 104 which it will do shortly before the pawl 106 drops into this notch and also into the notch 98 of the lower disk 96. The lever 40 is connected to the lower end of the link 84 by a removable pin 140 which may be taken out and then replaced in the opening in the lever and in an opening in a lug 142 carried by the frame. When this is done, the gear 36 is moved up into the dotted position shown in Fig. 2.

Figure 4:
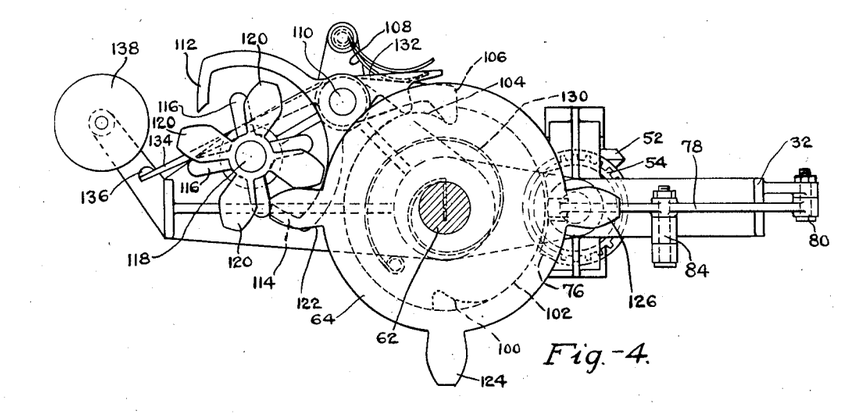
Fig. 4 is a view in horizontal section on the line 4—4 of Fig. 1.
Figure 10:
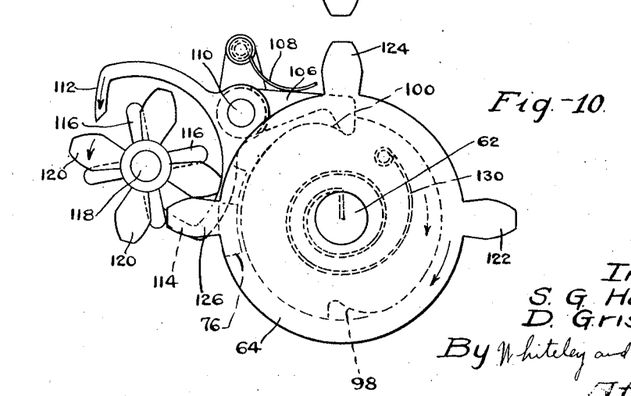

The operation and advantages of our invention will now be obvious. Assuming the mechanism to be in initial position as shown in Figs. 1 and 4, the toothed wheel 64 is held stationary by the escapement device and the upper disk 102 turns slowly clockwise during the periods when water is drawn and the meter runs. When the disk 102 has turned a small distance, the pawl 106 rides out of the notch 104 and the escapement arm is moved from the position shown in Fig. 4 into that shown in Fig. 8. This sets the escapement in readiness to release the tooth 122 when the pawl 106 again drops into a notch. It will be noted from Fig. 8 that the toothed wheel has been turned slightly but such movement is not sufficient to effect the operation of the valve and it will be apparent from an inspection of the cam 76 in Fig. 7 that this cam has not yet moved far enough to release the lever 78 from its position shown in Fig. 1. During this time, the gear 36 is in mesh with the gear 42 while the spring 130 is wound by the shaft 62 whenever the meter runs. When the disk 102 has nearly completed one rotation, the short pawl 132 whose point is in advance of the point of the pawl 106, drops into the notch 104 and the hammer 136 is caused to strike the bell 138 as a warning that the water will soon be cut off from the service pipe. The foregoing operations are purely automatic. If the regeneration is to be carried on automatically the valve will be shifted from the softening position to the regenerating position as soon as the capacity run is completed. Then after the proper amount of brine has been passed through the softener tank, as determined by the amount of water measured by the meter 14, the valve will be shifted from the regeneration position to the rinse position. A measured amount of fresh water is then allowed to pass through; being measured by the meter 14. After the rinse operation the valve is shifted back to its normal softening position and the apparatus recommences its cycle of operation. The apparatus may, however, be made to operate semiautomatically, that is, the time of regeneration may be postponed to suit the convenience of the operator. If for any reason it is not convenient that the water be cut off within the next few minutes after the alarm is given, the pin 140 which connects the lever 40 with the link 84 is removed and then replaced in the opening in the lever and the opening in the lug 142 so that the gear 42 will be maintained in raised position as shown in dotted lines in Fig. 2 and the link 84 will be left hanging. It is of course not intended that this condition shall be maintained for any great length of time since the softener device would not continue to function properly for a much longer period without regenerating. As soon as the special condition making it desirable to obtain water from the service pipe is over, the pin 140 is restored to its normal position. The disk 102 is then again connected for rotation and as soon as it has made a complete rotation, the pawl 106 drops into the notch 104 and the first tooth 122 of the wheel 64 is allowed to escape on account of the shifting of the escapement device. The spring 130 then causes the wheel 64 and the valve to complete a quarter-turn with the result that the wheel 64 comes into the position shown in Fig. 9 with the second tooth 124 unable to get past the escapement. In this position of the valve, water is shut off from the service pipe and is caused to flow through the regenerating device and then through the softener device. While the wheel 64 is completing its first quarter turn, the cam 76 is moved sufficiently to release the lever 78 and the gear 36 is shifted into the position shown in Fig. 2 into mesh with the gear 88 and the lower disk 96 starts to turn, but at a much faster speed than the upper disk 102 is turned. Soon after the disk 96 starts to turn, the pawl 106 is lifted out of the notch 98 and the escapement is reset to its position shown in Fig. 8. When the disk 96 has completed a one-half turn, the pawl 106 drops into the notch 100 and the wheel 64, under the tension exerted by the spring motor, makes another quarter-turn and is stopped in the position shown in Fig. 10 with the third tooth 126 unable to get past the escapement. The valve by this operation has been given another quarter-turn and has been brought into its third position in which water from the supply pipe goes through the softener device to rinse or wash out the brine into the waste pipe. Soon after the disk 96 starts the last half of its rotation, the pawl 106 is lifted out of the notch 100 and the escapement is then reset into the position shown in Fig. 8; when the disk 96 has completed a rotation, the pawl 106 again drops into the notch 98 and the wheel 64 completes a half-turn which brings it, together with the valve, into initial position so that the cycle of operation may be gone through with again. It is to be noted that the worm gearing serves not only as a reduction gearing, but as a lock for the spring motor to prevent reverse movement even when the gear 36 is disengaged from the gear 42. It will be also noted that the amount of water which may be drawn from the service pipe before the regenerating operation starts may be readily varied by changing the gear ratio of the gears 58 and 60. The amount of water that passes through the softener device before regeneration may therefore be varied according to the degree of hardness of the water. A change in the ratio of the gears 58 and 60 will not affect the duration of the regenerating and rinse operations since these operations are controlled through gears operated independently of the gears 58 and 60.

We claim—

1. In mechanism of the class described, the combination of a fluid operated meter, a fluid supply pipe connected with said meter, a single valve casing having fluid passage communication with said meter, a single shiftable valve in said valve casing for controlling the passage of fluid, and connections between said meter and valve for shifting said valve into successively different positions for differently controlling the passage of fluid when a predetermined amount of fluid has passed through said meter.

2. In mechanism of the class described, the combination of a fluid operated meter, a fluid supply pipe connected with said meter, a single valve casing having fluid passage communication with said meter, a single shiftable valve in said valve casing for controlling the passage of fluid, connections between said meter and valve for shifting said valve into successively different positions for differently controlling the passage of fluid when a predetermined amount of fluid has passed through said meter, a signal device, and means for operating said signal device shortly before said shifting movement commences.

3. In mechanism of the class described, the combination of a fluid operated meter, a fluid supply pipe connected with said meter, a valve casing having fluid passage communication with said meter, a shiftable valve in said valve casing for controlling the passage of fluid, connections between said meter and valve for shifting said valve for differently controlling the passage of fluid when a predetermined amount of fluid has passed through said meter, a signal device, means for operating said signal device shortly before said shifting movement commences, and means whereby said connections may be rendered inoperative, after said signal device has been operated.

4. In mechanism of the class described, the combination of a fluid operated meter, a fluid supply pipe connected with said meter, a single valve casing having fluid passage communication with said meter, a single shiftable valve in said casing for controlling the passage of fluid, connections between said meter and valve for shifting said valve into successively different positions for differently controlling the passage of fluid when a predetermined amount of fluid has passed through said meter, and means in said connections whereby the predetermined amount of fluid may be varied.

5. In mechanism of the class described, the combination of a fluid operated meter, a fluid supply pipe connected with said meter, a single valve casing having fluid passage communication with said meter, a single shiftable valve in said valve casing for controlling the passage of fluid, a motor controlled by said meter, and connections between said motor and valve for shifting said valve into successively different positions for differently controlling the passage of fluid when a predetermined amount of fluid has passed through said meter.

6. In mechanism of the class described, the combination of a fluid operated meter, a fluid supply pipe connected with said meter, a single valve casing having fluid passage communication with said meter, a single shiftable valve in said valve casing for controlling the passage of fluid, a motor controlled by said meter, connections between said motor and valve for shifting said valve into successively different positions for differently controlling the passage of fluid when a predetermined amount of fluid has passed through said meter, a signal device, and means for operating said signal device shortly before said motor shifts said valve.

7. In mechanism of the class described, the combination of a fluid operated meter, a valve casing having fluid passage communication with said meter, a shiftable valve in said valve casing for controlling the passage of fluid, a motor controlled by said meter, connections between said motor and valve, and means associated with said connections whereby the motor will first shift said valve when a predetermined amount of fluid has passed through said meter and then after successive intervals will shift the valve into other positions.

8. In mechanism of the class described, the combination of a water operated meter, a water supply pipe connected with said meter, a valve casing having fluid passage communication with said meter, a shiftable valve in said valve casing for controlling the passage of water, said valve when in first position permitting water to flow from the supply system in a particular manner and when in second position, permitting water to flow from the supply system in a different manner and when in third position, permitting water to flow from the supply system in another different manner, a motor controlled by said meter, and connections between said motor and valve for shifting said valve from first position to second position when a predetermined amount of water has passed through said meter and then after successive intervals from second position to third position and from third position back to first position.

9. In mechanism of the class described, the combination of a fluid operated meter, a fluid supply pipe connected with said meter, a valve casing having fluid passage communication with said meter, a shiftable valve in said valve casing for controlling the passage of fluid, a spring motor, connections for winding said motor from said meter, connections between said motor and valve, and an escapement device which normally restrains said motor and permits it to shift said valve for differently controlling the passage of fluid when a predetermined amount of fluid has passed through said meter.

10. In mechanism of the class described, the combination of a fluid operated meter, a fluid supply pipe connected with said meter, a valve casing having fluid passage communication with said meter, a shiftable valve in said valve casing for controlling the passage of fluid, a pipe connecting said meter with said valve casing, a spring motor, a reduction gearing for winding said motor from said meter, connections between said motor and valve, an escapement device which normally restrains said motor, and mechanism associated with said escapement device whereby said motor will first shift said valve when a predetermined amount of fluid has passed through said meter and then after successive intervals, will shift said valve into other positions.

11. In mechanism of the class described, the combination of a water operated meter, a water supply pipe connected with said meter, a valve casing having fluid passage communication with said meter, a rotatable valve in said valve casing for controlling the passage of water, said valve when in first position permitting water to flow from the supply system in a particular manner and when in second position, permitting water to flow from the supply system in a different manner and when in third position permitting water to flow from the supply system in another different manner, a spring motor, connections between said motor and valve, an escapement device which normally restrains said motor, a shiftable gear splined on the shaft of said meter, a reduction gearing which connects said shiftable gear when in one position with the motor shaft for winding the motor, a disk secured to the motor shaft, connections between said disk and escapement device which permit said motor to shift said valve from first position to second position when a predetermined amount of water has passed thru said meter, means for then moving said shiftable gear into another position, a second disk rotatably mounted, gearing which connects said shiftable gear when in last mentioned position with said second disk, and connections between said second disk and the escapement device which permits said motor after successive intervals to shift said valve from second position to third position and then from third position back to first position.

12. In a mechanism of the character described, the combination with a valve mechanism to be operated, of a meter arranged to operate as fluid is passed therethrough, means under the control of said meter having connection with said valve mechanism for operating the same, the operation of said means being arranged to occur when a predetermined amount of fluid has passed through the meter, a signal device, and means operated by the valve operating means before the valve mechanism is operated for operating the signal.

13. In a mechanism as set forth in claim 12, the provision of means in connection with said signal device whereby the operation of said valve mechanism may be prevented and the mechanism caused to remain inoperative upon the operation of the signal device thereby making the mechanism semi-automatic.

14. In a mechanism as set forth in claim 12, the provision in connection with said signal device of a manually controlled device, the setting of which determines whether the mechanism operates fully automatically or semi-automatically.

15. In a mechanism as set forth in claim 12, the provision of means in connection with the signal device arranged when set in one position to render the mechanism inoperative upon the operation of said signal device, but arranged otherwise to allow the fully automatic operation of the mechanism.

16. In a mechanism of the character described, the combination with a valve mechanism to be operated, of a meter arranged to operate as fluid is passed therethrough, means under the control of said meter having connection with said valve mechanism for operating the same, the operation of said means being arranged to occur when a predetermined amount of fluid has passed through the meter, and a manually controlled device arranged to be set to render said valve operating means inoperative and thereby make the mechanism semi-automatic in its operation.

17. In a mechanism of the character described, the combination with a valve mechanism to be operated, of a meter arranged to operate as fluid is passed therethrough, means connected with the valve mechanism to operate the same at a predetermined time when a predetermined amount of fluid has passed through said meter, a release for said means to place the same into operation, and connections between said meter and said release to operate the latter, comprising a low ratio and a high ratio driving connection whereby said release is operated by the low ratio driving connection only after the meter has operated a comparatively long period and whereby said release is operated by the high ratio driving connection in the course of a shorter period of operation of said meter.

18. A mechanism as set forth in claim 17 wherein said low ratio driving connection includes parts whereby the period of operation of said meter previous to the operation of said release may be varied to suit requirements.

19. In a mechanism of the character described, the combination with a valve mechanism to be operated, of a meter arranged to operate as fluid is passed therethrough, two gear trains operated by said meter, the one train including reduction gearing and having the terminal element of the train slowly advanced in its travel by operation from the meter through said reduction gearing, the other train being of a higher ratio and having the terminal element thereof relatively quickly advanced in its travel by operation through said train from the meter, means having connection with said valve mechanism for operating the same arranged to be normally idle except when released to be set into operation, and a release operated by the terminal element of the low ratio gear train for one run of the meter and operated by the terminal element of the high ratio gear train for a succeeding run.

20. In a mechanism as set forth in claim 19, the provision of means for making a detachable drive connection between said meter and said high ratio gear train whereby the latter is inoperative throughout the course of the first mentioned run.

21. In a mechanism of the character described, the combination with a valve mechanism to be operated, of a meter arranged to be operated as fluid is passed therethrough, a device having connection with said valve mechanism for operating the same, a spring having energy stored therein, said spring being normally idle but arranged upon release to set said device into operation to operate said valve mechanism, an escapement mechanism for controlling the release of said spring, and means operated from said meter for operating said escapement mechanism after a predetermined amount of fluid has passed through the meter.

22. In a mechanism as set forth in claim 21, the provision in said last mentioned means of a low ratio driving connection between the meter and said escapement mechanism to permit a long period of operation of the meter before the operation of said escapement mechanism for the first mentioned run of the meter, and a high ratio driving connection between the meter and said escapement mechanism to permit a shorter period of operation of the meter before the operation of said escapement mechanism during a succeeding run.

23. In a mechanism as set forth in claim 21, the provision in said last mentioned means of a low ratio driving connection between the meter and said escapement mechanism to permit a long period of operation of the meter before the operation of said escapement mechanism for one run, and a high ratio driving connection between the meter and said escapement mechanism to permit a shorter period of operation of the meter before the operation of said escapement mechanism during a succeeding run, there being a detachable connection between said meter and said high ratio driving connection whereby the latter is inoperative throughout the course of the first run and is operative only during the succeeding run.

24. In a mechanism of the character described, the combination with a valve mechanism to be operated, of a meter arranged to operate when fluid is passed therethrough and normally arranged to cause the operation of said valve mechanism when a predetermined amount of fluid has passed therethrough, means having connection with said valve mechanism for operating the same, and connections between said meter and said last mentioned means normally to accomplish the operation of said valve mechanism at the predetermined interval, said connections including a part arranged to be shifted from a normal operative position to disconnect the meter from the mechanism, whereby fluid subsequently passed through the meter does not produce the usual corresponding operation of said mechanism.

25. In a mechanism as set forth in claim 24, the provision of a manually controlled device whereby said meter may be left disconnected from the mechanism for any desired interval of time.

26. In a mechanism of the character described, the combination with a valve mechanism to be operated, of a meter arranged to operate as fluid is passed therethrough, means having connection with said valve mechanism for operating the same normally arranged to be idle, but to be set into operation when a predetermined amount of fluid has passed through the meter, an escapement for releasing said valve operating means, and means operated by said meter for operating said escapement to release said valve operating means for operation, said escapement serving also to stop said valve operating means upon the completion of an operation of said valve mechanism.

27. In a mechanism as set forth in claim 26, the provision in connection with said escapement, of a part turning with said valve mechanism serving by cooperation with said escapement to limit the movements of said valve mechanism upon each operation whereby definitely to determine the positions thereof.

28. In a mechanism of the character described, the combination with a valve mechanism to be operated, of a meter arranged to be operated as fluid is passed therethrough, a device having connection with said valve mechanism for operating the same, a spring arranged to be wound in the operation of said mechanism to store energy therein, said spring being normally idle but arranged upon release to set said device into operation to operate said valve mechanism, a release device controlling the release of said spring, and means operated from said meter when a predetermined amount of fluid has passed therethrough for operating said release device.

29. In a mechanism as set forth in claim 28, the provision of means whereby said spring is wound intermittently in the operation of said mechanism, and whereby said release device is operated intermittently so that the tension of said spring in intermittently relieved, the winding up of the spring being no greater than the unwinding thereof in the course of repeated operations of said mechanism.

30. In a mechanism of the character described, the combination of a meter arranged to operate whenever fluid is passed therethrough, valve mechanism to be operated, means associated with said valve mechanism for operating the same, connections between said meter and said last mentioned means to operate the valve mechanism after a certain amount of fluid has passed through the meter, the said meter being arranged after the operation of the valve mechanism to continue to have fluid passed therethrough, and other connections between the meter and the same means arranged to cause the operation of the valve mechanism again after a different amount of fluid has passed through the meter.

31. In a mechanism of the character described, the combination of a meter arranged to operate whenever fluid is passed therethrough, valve mechanism to be operated, means associated with said valve mechanism to operate the same, connections between said meter and said last mentioned means to operate the valve mechanism after a certain amount of fluid has passed through the meter and other means arranged to cause the operation of the valve mechanism a second time after a different amount of fluid has passed through the meter.

32. In a mechanism of the character described, the combination of a meter arranged to operate whenever fluid is passed therethrough, valve mechanism to be operated, means associated with said valve mechanism for operating the same, and transmission intermediate said meter and said means to operate the valve mechanism after a predetermined amount of running of the meter, said transmission including a device arranged after a certain predetermined amount of fluid has passed through the meter to initiate the operation of the valve mechanism from the normal position thereof, the said device being arranged after a different predetermined amount of fluid has passed through the meter to initiate another operation of the valve mechanism, 33. In a mechanism of the character described, the combination of a meter arranged to operate whenever fluid is passed therethrough, valve mechanism to be operated, means associated with said valve mechanism for operating the same, and connections of both a low and a high ratio form between said meter and said last mentioned means to initiate the operation of the valve mechanism, the low ratio portion of said connections being arranged after a certain comparatively large amount of fluid has passed through the meter to initiate a first operation of the valve mechanism, the said meter being arranged after this operation of the valve mechanism to continue to have fluid passed therethrough, and the high ratio portion of said connections being arranged to initiate a second operation of the valve mechanism after a certain comparatively small amount of fluid has passed through the meter.

34. In a mechanism of the character described, the combination of a meter arranged to operate whenever fluid is passed therethrough, valve mechanism controlling the direction of flow of the fluid in a system connected with the meter, means associated with said valve mechanism for operating the same, a means arranged to throw the last mentioned means into operation to operate the valve mechanism after a certain amount of fluid has passed through the meter and through the valve mechanism, the valve mechanism after this initial operation causing a fluid flow through the system in a different path, and another means arranged to cause the operation of the valve mechanism again after a different amount of fluid has passed through the valve mechanism.

35. A structure as set forth in claim 34, wherein the last mentioned means is arranged to cause two distinct operations of the valve mechanism after the initial operation thereof, each of the operations following the passage of a definite predetermined amount of fluid through the valve mechanism as herein described.

36. In mechanism of the character described, the combination of a fluid operated meter, a fluid supply pipe connected therewith, a valve casing having fluid passage communication with said meter, a shiftable valve in said casing for controlling the passage of fluid, said valve when in one position permitting fluid to flow from the supply system in a particular manner and when in another position permitting fluid to flow from the supply system in a different manner, motive means controlled by the meter, and connections between said means and the valve for shifting the latter from the first position to the second position when a predetermined amount of fluid has passed through the meter and for shifting the valve again from the second position when another predetermined amount of fluid has passed through the meter.

37. A mechanism of the character described comprising in combination with a source of fluid supply and a single tank to receive fluid therefrom, valve mechanism controlling the manner of connection of the tank with the fluid supply, the said valve mechanism being arranged to be operated to a plurality of positions to cause fluid flow from the supply system in different manners, a fluid operated meter, and connections between said meter and said valve mechanism for operating the latter more than once for differently controlling the passage of fluid through the tank when a predetermined amount of fluid has passed through the meter.

38. A mechanism as set forth in claim 37 including a signal device, and means for operating the same before the operation of the valve mechanism occurs.

39. A mechanism as set forth in claim 37 including a signal device, means for operating the same before the operation of the valve mechanism occurs, and means whereby the connections between the meter and the valve mechanism may be rendered inoperative after the signal device has been operated.

40. In a mechanism of the character described, the combination of a valve mechanism, means for operating the same, a meter arranged to operate continuously as fluid is passed therethrough, a signal, means arranged to be operated after the meter has had a predetermined amount of fluid passed therethrough to operate the signal before the operation of the valve mechanism, and means operable automatically or semi-automatically after a predetermined amount of fluid has passed through the meter to cause the operation of the valve mechanism.

41. A mechanism as set forth in claim 40 wherein the last mentioned means is arranged to cause another operation of the valve mechanism after a different amount of fluid has passed through the meter, said signal being inoperative in the case of the second operation of the valve mechanism.

42. In a mechanism of the character described, the combination with a meter and valve mechanism the operation of which is arranged to be controlled by the meter, of means arranged after a certain amount of operation of the meter to cause the operation of the valve mechanism, and after a different amount of operation of the meter to cause another operation of the valve mechanism.

43. In a mechanism of the character described, the combination with a meter and valve mechanism the operation of which is arranged to be controlled by the meter, of means arranged after a certain amount of operation of the meter to cause an operation of the valve mechanism and thereafter, in succession, to cause still other operations of the valve mechanism after succeeding amounts of operation of the meter different from the initial amount of operation thereof.

44. In a mechanism of the character described, the combination with a single tank and a source of fluid supply connected therewith, of a meter measuring the fluid flow, valve mechanism arranged to be operated successively to vary the connections of the fluid supply source with the tank in a predetermined manner, and means arranged to cause successive operations of the valve mechanism after a predetermined amount of fluid has passed through the meter.

45. A mechanism as set forth in claim 44 wherein the last mentioned means causes the initial operation of the valve mechanism following the passage of a certain amount of fluid through the meter, and wherein said means causes a succeeding operation of the valve mechanism following the passage of a different amount of fluid through the meter.

46. In a mechanism of the character described, the combination with a meter and valve mechanism the operation of which is arranged to be controlled by the meter, of a signal, means arranged to cause the operation of the signal at a certain point in the operation of the meter, and means operable automatically or semi-automatically after a predetermined amount of fluid has passed through the meter to cause the operation of the valve mechanism.

In testimony whereof we hereunto affix our signatures.

STANLEY G. HARWOOD.
DONALD GRISWOLD.